Patented Apr. 15, 1924.

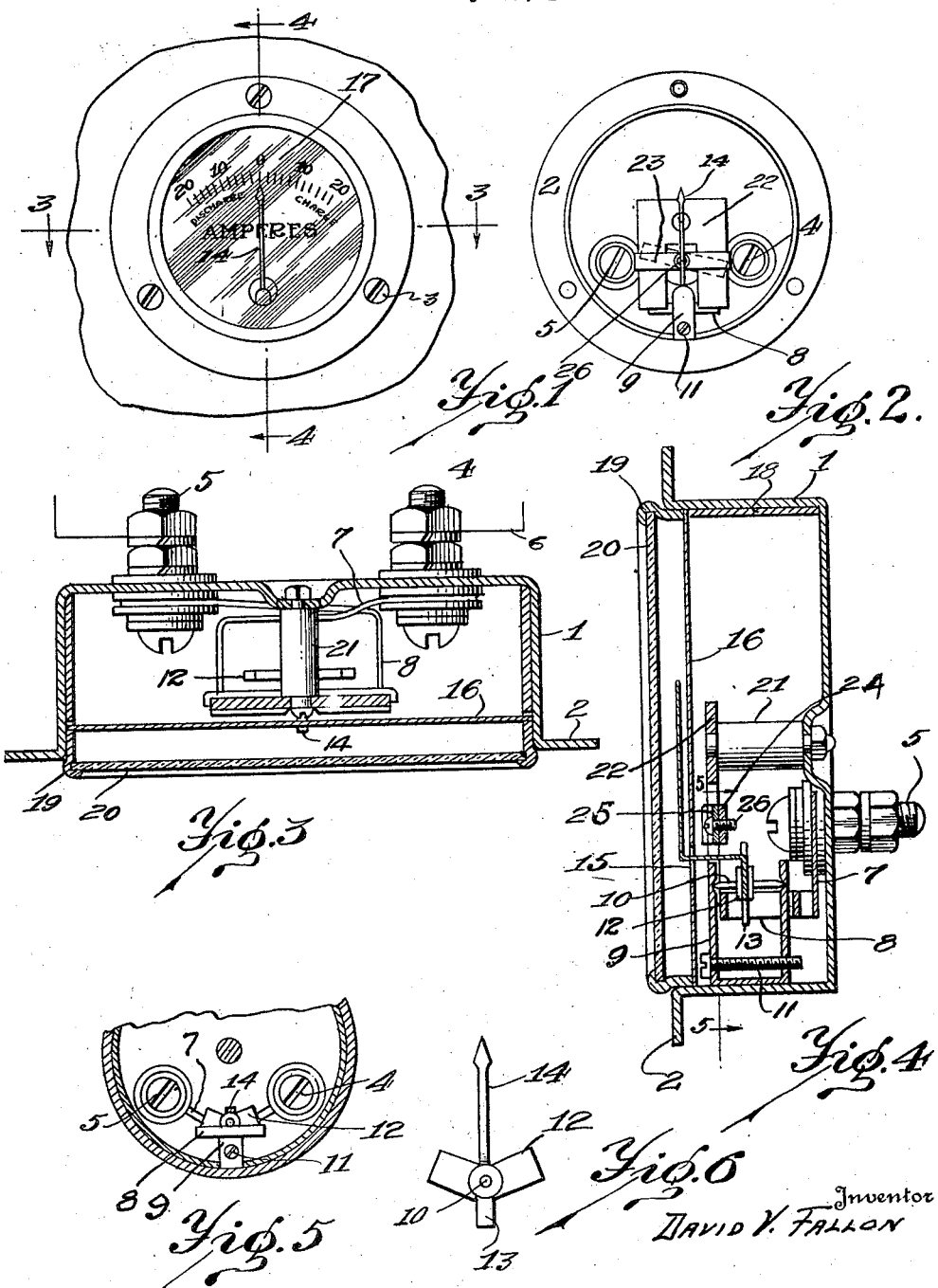

1,490,167

UNITED STATES PATENT OFFICE.

DAVID V. FALLON, OF DETROIT, MICHIGAN, ASSIGNOR TO DONGAN ELECTRIC MANUFACTURING CO., OF DETROIT, MICHIGAN, A CORPORATION OF MICHIGAN.

AMMETER.

Application filed July 26, 1920. Serial No. 399,077.

*To all whom it may concern:*

Be it known that I, DAVID V. FALLON, a citizen of the United States, residing at Detroit, county of Wayne, State of Michigan, have invented a certain new and useful Improvement in Ammeters, and declare the following to be a full, clear, and exact description of the same, such as will enable others skilled in the art to which it pertains to make and use the same, reference being had to the accompanying drawings, which form a part of this specification.

This invention relates to ammeters for indicating the direction of flow of current in a circuit, as for instance a battery line, and the object is to provide an ammeter of an extremely simple and inexpensive construction that is accurate in operation. A further object is to provide an ammeter utilizing a magnet in which the power and extent of the magnetic field may be readily varied to normally hold the pointer of the ammeter through magnetic influence at zero indication when the circuit is "dead." The principal feature of the invention is involved in the provision of a movable armature for the magnet for increasing or decreasing the length of the arm thereof to vary the force and extent of the magnetic field about the poles. These and other objects and the several novel features of the invention are hereinafter more fully described and claimed, and the preferred form of construction of an ammeter embodying my invention is shown in the accompanying drawings in which—

Fig. 1 is a front elevation of an ammeter showing the dial and the pointer.

Fig. 2 is an elevation of the ammeter with the dial removed showing clearly the general position of the magnet and movable armature.

Fig. 3 is a horizontal section on an enlarged scale taken on line 3—3 of Fig. 1.

Fig. 4 is a vertical section on an enlarged scale taken on line 4—4 of Fig. 1.

Fig. 5 is a detail of the pointer in section taken on line 5—5 of Fig. 4.

Fig. 6 is a detail of the pointer and shaft supporting the same showing the armature subject to the influence of the magnetic field of the magnet.

The general form of the ammeter is immaterial. The casing may be of any approved shape or design and is here shown as being circular in form adapted for mounting on an instrument board, as for instance the instrument board of an automobile, and the casing 1 is substantially cup shaped in form having a lateral flange 2 at the face thereof apertured to receive the screws 3 for supporting the same on the instrument board. Two terminals 4 and 5 are provided which, on the outer side of the casing, may be attached a line 6 of an electric circuit.

In the interior of the case these terminals 4 and 5 are connected by a copper line 7 which is formed in the shape of a loop 8, which loop occupies relatively a horizontal plane as will be understood from Fig. 4. In the lower side of the case is fixedly mounted a U-shaped bracket member 9, preferably formed of brass, the arms of which are provided with conical recesses for the coned ends of a shaft 10, which shaft is slightly above the plane of the coil 8 as shown in Fig. 4. To adjust the arms of the U shaped member 9 to provide for free rotative movement of the shaft 10 a screw 11 is provided near the lower ends of the said arms whereby the distance between the ends of the arms may be increased or diminished and the shaft 10 thus held in place while permitting a free movement thereof. On this shaft, is secured an armature 12 of magnetic metal preferably slightly V shaped in form as shown, and depending centrally therebelow is a weight 13 which acts as a counterbalance for the pointer 14 attached to the armature member or shaft. This pointer member, as will be observed from Fig. 4, extends outwardly parallel to the shaft 10 through an aperture 15 in the dial plate 16 and thence upward across the dial plate as shown in Fig. 4.

The dial plate 16 is provided with the usual graduations 17 extending each way from the central zero point preferably in an arcuate form over which or adjacent to which the end of the pointer may move and one side of the graduations is utilized to give an indication when the battery connected with the circuit 6 is being charged and the other side to indicate when a discharge of current occurs in the battery line. The dial may be secured in position in any approved manner and is here shown as being supported upon a ring member 18 inserted within the casing 1 and less in width than the depth of the casing and over the dial plate which rests on the edge of the ring as shown in Figs. 3 and 4 is secured an annular ring member 19 carrying a glass 20, the ring member being a press fit in the case and the glass providing a cover for the dial in the usual way. Substantially centrally of the case is provided a standard 21 on which is secured an ordinary U shaped magnet 22 shown in elevation in Fig. 2 and in section in Fig. 4. This magnet is of the usual hardened type of permanent magnet and the lower ends of the arms thereof extend downward from the point of support just forward of the coil 8 of the line 7 between the terminals 4 and 5 and thus are also positioned just forward of and out of contact with the armature 12 of the pointer. The ends of the magnet are mounted in the case equidistantly each side of the pointer shaft and thus are positioned in similar relation to opposite ends of the armature 12 of the pointer. Due to the inaccuracies of workmanship, one side of the armature 12 for instance may have an indeterminate excess of material tending to cause the pointer to normally stand one side or the other of the zero point which may be corrected by bending the pointer to register zero when no current is flowing through the coil. The magnet, although carefully positioned, may be slightly out of true relationship and tend to turn the pointer slightly to one side or the other through a magnetic influence. To correct this I have provided a movable armature 23 for the magnet which consists of a soft iron bar 24 centrally secured to a bar 25 of non-magnetic material. In this construction the two bars being on opposite sides of the magnet are securely held in position by the screw 26, and the magnetic field may be increased or diminished by moving the armature 24 from or toward the ends of the magnet.

In case the pointer member is slightly out of position the member 24 may be turned upon the screw member 26 as indicated in dotted lines in Fig. 2 and in one direction or the other as may be required to decrease the magnetic field on one side and increase it on the other. The increased magnetic field on the one side of the magnet and decreased field on the other would correspondingly vary the reading on either side of the zero indication and the movable bar thus provides a means for adjusting the device to secure an accurate reading. This adjustment, however, does not affect the absolute reading. By use of the adjustable bar the effective length of the magnet is varied. By this I mean that the length of the portions of the magnet extending below the movable armature may be varied.

As heretofore stated, the armature 12 of the pointer is within the magnetic field of the coil 8 and flow of current in one direction or the other through the coil tends to cause the armature to stand vertically in the coil rather than transversely thereof through influence of the permanent magnet. The flow in one direction, when the battery is discharging, through influence of the magnetic field of the coil 8 would tend to turn the armature and pointer member secured thereto contra-clockwise while flow through the coil in a direction to charge the battery would tend to turn the pointer armature in a clockwise direction and the amperage of the flow will determine the extent of movement of the pointer, the graduations on the dial having been so made that the amperage of current flow is indicated thereby.

From the foregoing description it is evident that the construction of the device is simple in the extreme and that an accuracy of adjustment of the pointer reading is readily accomplished, and that by means of this adjustment inaccuracies of workmanship are not of material moment, and that when once adjusted in the general manner described, the instrument is accurate and reliable in operation.

Having thus fully described my invention, what I claim and desire to secure by Letters Patent of the United States is:—

1. In an ammeter, a casing, a pair of terminals adapted for connection in a circuit, a coil connecting the two terminals within the casing, a pivotally mounted pointer member having an armature within the magnetic field of the coil extending normally transversely thereof, a magnet having polar portions extending to a position adjacent the coil and armature member of the pointer to influence the same, and a movable armature for the said magnet adapted to increase or decrease the effective length of the magnet and adapted to be positioned to differentially vary the length of the polar portions.

2. In an ammeter having a pair of terminals and a coil connecting the same, a pointer member pivotally mounted and provided with an armature within the magnetic field of the coil, a permanent magnet having polar portions adjacent the coil and the said pointer armature, and an adjustable armature for the magnet to increase or decrease the effective length of the metallic path of magnetism and correspondingly increase or decrease its field of force.

3. In an ammeter having a pair of terminals and a coil connecting the same, a pivotally mounted pointer member provided with an armature within the magnetic field of the coil normally extending transversely of the coil, a permanent horse-shoe magnet positioned with the polar portions thereof adjacent the coil and the pointer armature, and an armature for the magnet adapted to be adjusted to increase or decrease the effective length of the polar portions to correspondingly vary the field of force and further adapted to be adjusted to differentially vary the length of the two polar portions substantially as and for the purpose described.

4. In an ammeter, a pair of terminals, a coil connecting the same, a pivotally mounted pointer member provided with an armature positioned within the magnetic field of the coil and normally extending transversely thereof, a counterweight tending to hold the pointer in neutral position, a permanent magnet having polar portions adjacent the coil and said pointer armature, and an adjustable armature for the magnet adapted to be adjusted to increase or decrease the field of force of the magnet and further being adjustable to vary the relative length of the arms of the magnet to differentially vary the field of force of the respective polar portions.

In testimony whereof, I sign this specification.

DAVID V. FALLON.